(12) United States Patent
Freienstein et al.

(10) Patent No.: US 11,007,959 B2
(45) Date of Patent: May 18, 2021

(54) METHOD FOR CORRECTING AT LEAST ONE COLLISION PARAMETER AND CORRESPONDING INTEGRATED SAFETY SYSTEM FOR A VEHICLE

(71) Applicant: Robert Bosch GmbH, Stuttgart (DE)

(72) Inventors: Heiko Freienstein, Weil der Stadt (DE); Sybille Eisele, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/066,573

(22) PCT Filed: Oct. 11, 2016

(86) PCT No.: PCT/EP2016/074302
§ 371 (c)(1),
(2) Date: Jun. 27, 2018

(87) PCT Pub. No.: WO2017/114603
PCT Pub. Date: Jul. 6, 2017

(65) Prior Publication Data
US 2019/0016285 A1 Jan. 17, 2019

(30) Foreign Application Priority Data
Dec. 28, 2015 (DE) .......................... 102015226762.8

(51) Int. Cl.
*B60R 21/0136* (2006.01)
*B60R 21/0134* (2006.01)
(Continued)

(52) U.S. Cl.
CPC ........ *B60R 21/0134* (2013.01); *B60R 21/013* (2013.01); *B60R 21/0132* (2013.01); *B60R 21/0136* (2013.01)

(58) Field of Classification Search
None
See application file for complete search history.

(56) References Cited

U.S. PATENT DOCUMENTS 5,374,932 A * 12/1994 Wyschogrod ........... G01S 13/56
342/36
6,176,837 B1 * 1/2001 Foxlin .................... A61B 5/103
600/595
(Continued)

FOREIGN PATENT DOCUMENTS

DE 102004032048 A1 1/2006
DE 102009046057 A1 5/2011
(Continued)

OTHER PUBLICATIONS

International Search Report dated Jan. 4, 2017 of the corresponding International Application PCT/EP2016/074302 filed Oct. 11, 2016.

*Primary Examiner* — Jelani A Smith
*Assistant Examiner* — Melanie J Patrick
(74) *Attorney, Agent, or Firm* — Norton Rose Fulbright US LLP; Gerard Messina

(57) ABSTRACT

In a method for correcting at least one collision parameter determined by an anticipatory environment-sensor system of a vehicle and in a corresponding integrated safety system of the vehicle, a common time basis is established in the vehicle, a signal age and/or a latency time of at least one collision parameter is ascertained based on the common time base and on a time stamp that is output together with the at least one collision parameter, the at least one collision parameter is corrected based on the ascertained signal age and/or ascertained latency time, and the corrected parameter is output to at least one precrash function prior to an impact.

14 Claims, 3 Drawing Sheets

(51) Int. Cl.
*B60R 21/0132* (2006.01)
*B60R 16/023* (2006.01)
*B60R 21/013* (2006.01)

(56) References Cited

U.S. PATENT DOCUMENTS

| | | | |
|---|---|---|---|
| 7,260,461 B2 * | 8/2007 | Rao | B60R 22/00 |
| | | | 701/45 |
| 10,083,551 B1 * | 9/2018 | Schmitt | G06F 19/00 |
| 2002/0147534 A1 * | 10/2002 | Delcheccolo | G05D 1/00 |
| | | | 701/45 |
| 2003/0139864 A1 | 7/2003 | Schondorf et al. | |
| 2003/0182035 A1 * | 9/2003 | DiLodovico | G08G 1/164 |
| | | | 701/32.2 |
| 2008/0291078 A1 * | 11/2008 | Hilsebecher | B60R 21/0134 |
| | | | 342/70 |
| 2013/0030686 A1 | 1/2013 | Morotomi et al. | |
| 2015/0268058 A1 * | 9/2015 | Samaraekera | G01C 21/36 |
| 2015/0375703 A1 * | 12/2015 | Modi | B60R 21/017 |
| 2016/0061946 A1 * | 3/2016 | Wallace | G01S 13/524 |
| 2016/0253566 A1 * | 9/2016 | Stein | G06T 7/40 |
| | | | 348/148 |
| 2017/0060810 A1 * | 3/2017 | Preston | G06F 17/00 |

FOREIGN PATENT DOCUMENTS

| | | | |
|---|---|---|---|
| DE | 102012202835 A1 | 8/2013 | |
| DE | 102013224697 A1 | 6/2015 | |
| EP | 2333578 A2 | 6/2011 | |

\* cited by examiner

METHOD FOR CORRECTING AT LEAST ONE COLLISION PARAMETER AND CORRESPONDING INTEGRATED SAFETY SYSTEM FOR A VEHICLE

CROSS-REFERENCE TO RELATED APPLICATIONS

The present application is the national stage of International Pat. App. No. PCT/EP2016/074302 filed Oct. 11, 2016, and claims priority under 35 U.S.C. § 119 to DE 10 2015 226 762.8, filed in the Federal Republic of Germany on Dec. 28, 2015, the content of each of which are incorporated herein by reference in their entireties.

FIELD OF THE INVENTION

The present invention relates to a method for correcting at least one collision parameter determined by an anticipatory environment-sensor system of a vehicle and to an integrated safety system for a vehicle.

BACKGROUND

Integrated safety systems known from the related art utilize information from different sources for an optimal personal-protection function in the event of a crash. These personal-protection function can involve passenger-protection systems and/or pedestrian-protection systems, for instance. Integrated safety encompasses the consideration of environmental information as well as driving-dynamics information in an effort to achieve an optimal protective function for the passenger or pedestrian in the event of a crash. Depending on the function, 'optimal' means a very fast reaction time of the restraint device or an adaptive protective function, i.e., a specific reaction with regard to the crash type, passenger type, passenger position, etc. For example, typical architectures of existing integrated safety systems include numerous components, such as an anticipatory environment-sensor system, which mainly have been set up and optimized for other functions. These components provide information to the integrated safety system via corresponding interfaces. For example, the anticipatory environment-sensor system is able to provide radar information to an airbag-control unit by way of a corresponding interface. This can create latency times for measurements, calculations, etc., which could even be variable in time (jitter). For example, an estimated time of impact and a relative velocity of a potentially dangerous object are preferably determined for further evaluations. This environmental information is valid only for a certain constant time window. If contact sensors react during this time window and if certain threshold values are exceeded, then the relative velocity is considered in the trigger decision as well. In an activation decision, e.g., for precrash functions, an uncertainty that was estimated conservatively and is therefore relatively high is used in the calculation. Due to the high time demands, the known integrated safety systems can thereby lose some of their usefulness.

From the document DE 10 2012 202 835 A1, a method and a device for plausibilizing an anticipatory sensor system of a vehicle are known. The known method includes a step of plausibilizing, in which a collision parameter determined from a sensor signal of the anticipatory sensor system is plausibilized using an impact-sensor signal that represents a signal from an impact sensor.

From the document DE 10 2013 224 697 A1, a method is known for establishing a common time basis for network users in a network of a motor vehicle. In this instance, a time master transmits a synchronization message in certain time intervals via the network, and the network users connected to the time master receive the synchronization message. The network users correct their own respective time basis using the received synchronization message and thus establish a common time basis.

SUMMARY

According to an example embodiment, a method for correcting at least one collision parameter determined by an anticipatory environment-sensor system of a vehicle has an advantage that actual latency times and an actual signal age are ascertained on the basis of a common time basis established in the vehicle, and that at least one previously determined collision parameter is corrected in a downstream correction step. The uncertainties in the age of the at least one collision parameter arise predominantly because of the computing times and transmission times that differ as a function of the data quantity. Especially in hardware-related signal processing of the environment-sensor system and in a transmission via bus systems, fluctuations can arise as a function of the data quantity. Internal transmissions between components within a component assembly as well as dedicated connections between two components are affected to a much lesser extent and are furthermore corrected. The at least one corrected collision parameter advantageously allows for improvements in the preconditioning of trigger algorithms and/or in the triggering of prefire functions, e.g., a reversible restraint device and/or actuators, prior to an impact, and/or in the triggering of pretrigger functions such as an irreversible restraint device and/or actuators prior to an impact.

Example embodiments of the present invention provide a method for correcting at least one collision parameter determined by an anticipatory environment-sensor system of a vehicle. A common time basis is established in the vehicle, and the at least one collision parameter is output, with a time stamp, to an evaluation downstream in the signal flow, which ascertains a signal age and/or a latency time of the at least one collision parameter on the basis of the time stamp of the at least one collision parameter and the common time basis, the evaluation correcting the at least one collision parameter on the basis of the ascertained signal age and/or the ascertained latency time and outputting it to at least one precrash function prior to an impact.

According to an example embodiment, an integrated safety system for a vehicle includes an anticipatory environment-sensor system, at least one precrash function, and a device for correcting at least one collision parameter determined with the aid of the anticipatory environment-sensor system. In this case, the correction device is designed to execute the method for correcting at least one collision partner determined by an anticipatory environment-sensor system of a vehicle, a time-master unit provides the common time basis, and based on the ascertained signal age and/or the ascertained latency time, a first evaluation and control unit corrects and outputs the at least one collision parameter, which is determined by a second evaluation and control unit of the environment-sensor system.

In this particular case, the evaluation and control unit can be understood as an electrical device, e.g., a control unit, in particular an airbag-control unit, which processes and evaluates detected sensor signals. The evaluation and control unit can have at least one interface, which could be developed in the form of hardware and/or software. In a hardware development, the interfaces can be part of what is generally known as a system ASIC, which includes many kinds of different functions of the evaluation and control unit. However, it is also possible that the interfaces are discrete integrated switching circuits or are at least partially made up of discrete components. In a software design, the interfaces can be software modules, which are provided on a microcontroller in addition to other software modules, for instance.

According to an example embodiment, a computer-program product includes program code stored on a machine-readable carrier, e.g., a semiconductor memory, a hard disk memory or an optical memory, and which is used for carrying out the evaluation when the program is executed by the evaluation and control unit.

In this context, an environment-sensor system is understood as a structural unit that includes at least one sensor element, which directly or indirectly detects a physical quantity or a change in a physical quantity and preferably converts it into an electrical sensor signal. For instance, this can be accomplished by the emitting and/or receiving of sound and/or electromagnetic waves and/or via a magnetic field or a change in a magnetic field, and/or by the receiving of satellite signals, e.g., a GPS signal, and/or by one or more video camera(s) having suitable image processing, and/or via active optical measuring methods such as lidar.

Possible are optical sensor elements, which, for instance, have a photographic plate and/or a fluorescent surface and/or a semiconductor, which detect an impinging or the intensity, the wavelength, the frequency, the angle etc. of the received wave, such as infrared sensor elements. Also conceivable is an acoustic sensor element such as an ultrasonic sensor element, and/or a high-frequency sensor element and/or a radar-sensor element and/or a sensor element that reacts to a magnetic field, e.g., a Hall-effect sensor element, and/or a magnetoresistive sensor element and/or an inductive sensor element, which registers the change in a magnetic field, e.g., via the voltage created by magnetic induction. The ascertaining of the sensor signals can take place statically and/or dynamically. In addition, the ascertaining of the sensor signals can be carried out on a continuous basis or a single time.

An evaluation and control unit integrated into the environment-sensor system or disposed outside evaluates the ascertained sensor signals and converts them into sensor data, which include a physical quantity ascertained from a physical quantity detected by the respective sensor unit, with the associated unit. In this context, for instance, a sensor element ascertains the path change within a specific time window, and the evaluation and control unit calculates a velocity and/or an acceleration and/or an impact instant therefrom. Additional physical quantities able to be calculated are the mass, force, energy, and/or other conceivable quantities, e.g., a probability of the occurrence of a certain event.

In an example embodiment of the present method, the at least one collision parameter can include an impact instant and/or a relative velocity between the vehicle and the impact object, and/or a distance between the vehicle and the impact object, and/or an impact location, for example. In addition, the evaluation is advantageously able to estimate a future error of the at least one collision parameter through an error propagation on the basis of the at least one collision parameter and the ascertained signal age, and/or the ascertained latency time.

It is particularly advantageous that the evaluation is able to fuse the corrected at least one collision parameter with a contact signal, which can be output by a contact-sensor system of the vehicle, and is able to generate an activation signal for a personal protection device on the basis of the fusion following the detected impact. Quite different sensor principles such as acceleration sensors, pressure sensors, structure-borne noise sensors, piezoelectric and/or optical sensors etc. can be used for the individual sensors of the contact-sensor system. Furthermore, on the basis of the ascertained signal age and/or the ascertained latency time, the evaluation is able to set up a dynamic acceptance-time window, inside which the at least one collision parameter can retain its validity for the generation of the activation signal. The length of the dynamic acceptance-time window can increase in a linear fashion with increasing signal age and/or with an increasing latency time, starting from a lower limit value that begins at a certain first signal age or latency instant, up to an upper limit value, which is maintained starting with a certain second signal age or latency instant. If a comparatively young value is available, then it is possible to select a narrow acceptance-time window for this evaluation cycle without restricting the usefulness. The random coincidences with acceleration signals are thereby able to be reduced, which offers great advantages in terms of robustness.

In one further example embodiment of the method, velocity classes can be adaptively selected for the activation of the at least one precrash function and/or of the personal protection device, on the basis of the ascertained signal age and/or the ascertained latency time. The differentiable velocity classes can be dynamically selected as a function of the actual age of the respectively determined relative velocity. A smaller prediction interval means smaller errors in the actual relative velocity at the impact instant and allows for a finer subdivision and differentiation of the crash cases. For instance, a finer subdivision and differentiation of the crash cases makes it possible to differentiate between the triggering of a first airbag stage and a second airbag stage. At a greater prediction interval, a rougher or normal subdivision and differentiation of the crash cases will result so that a differentiation is possible only between non-triggering or triggering of the second airbag stage.

In another advantageous further example embodiment of the method, the at least one precrash function can include a prefire function, which is able to activate a reversible restraint device and/or actuators prior to impact, and/or a pretrigger function, which is able to activate an irreversible restraint device and/or actuators prior to impact.

Known from the related art are anticipatory environment-sensor systems for vehicles that can include a multitude of individual environment sensors such as radar sensors, ultrasonic sensors, stereo/mono video cameras, laser scanners, and PMDs (photon multiplexing devices). For instance, such an environment-sensor system is able to be used in the vehicle for comfort functions, such as an adaptive cruise control (longitudinal control, ACC), forward collision warning (FCW), blind-spot detection (BSD), cross traffic alert (CTA), lane-keeping support (LKS), urban area/city safety, lane-departure warning (LDW), or parking aids.

In another advantageous further example embodiment of the safety system, the first evaluation and control unit is able to fuse the corrected at least one collision parameter with a contact signal that is output by a contact-sensor system of the vehicle and to generate an activation signal for a personal protection device after a detected impact on the basis of the fusion.

Exemplary embodiments of the present invention are shown in the drawing and will be described in greater detail in the following description. Identical reference numerals in the drawing denote components or elements that execute the same or similar functions.

DETAILED DESCRIPTION

Figure 1:
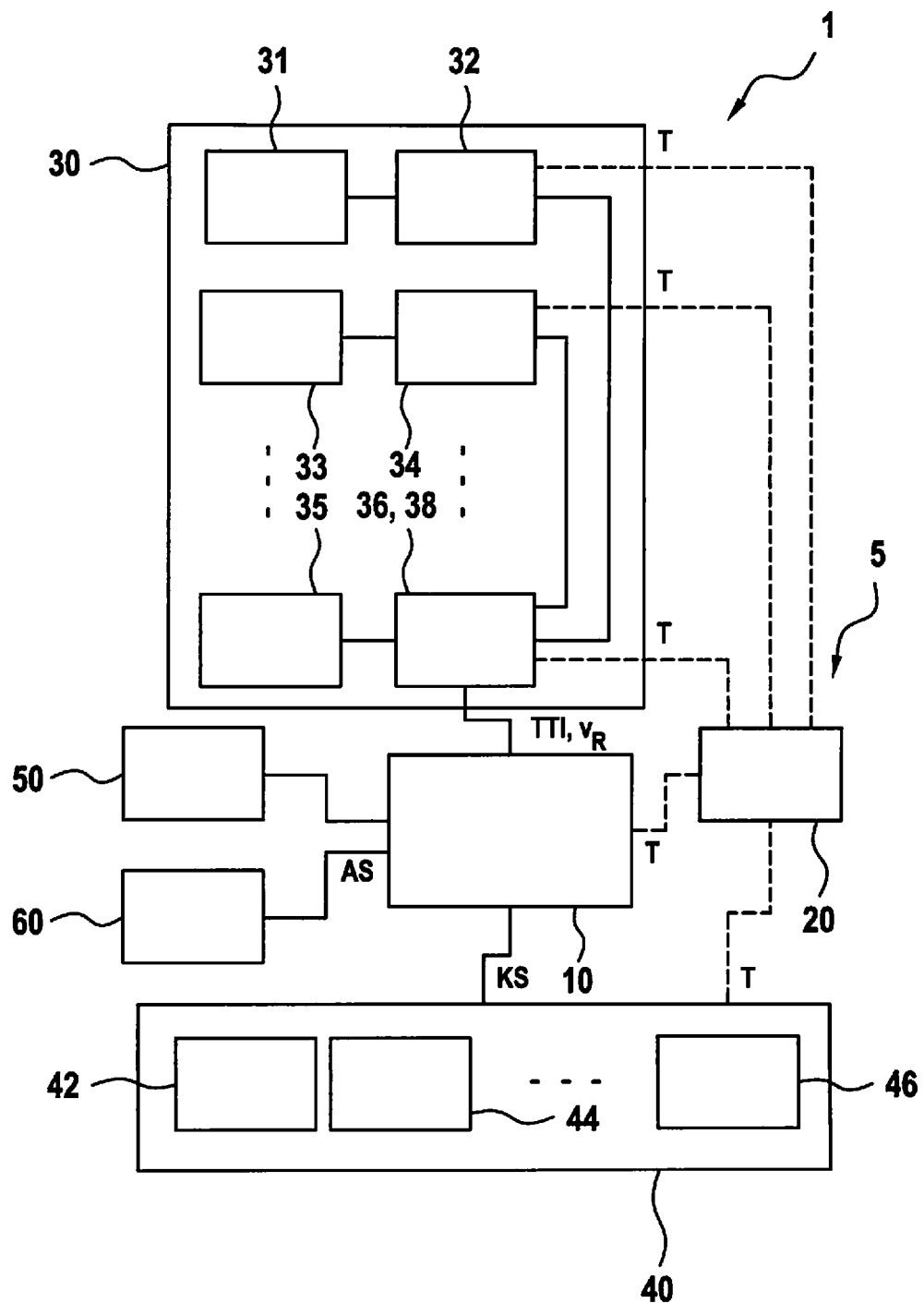
FIG. 1 shows a schematic block diagram of an integrated safety system for a vehicle, according to an example embodiment of the present invention.
Figure 2:
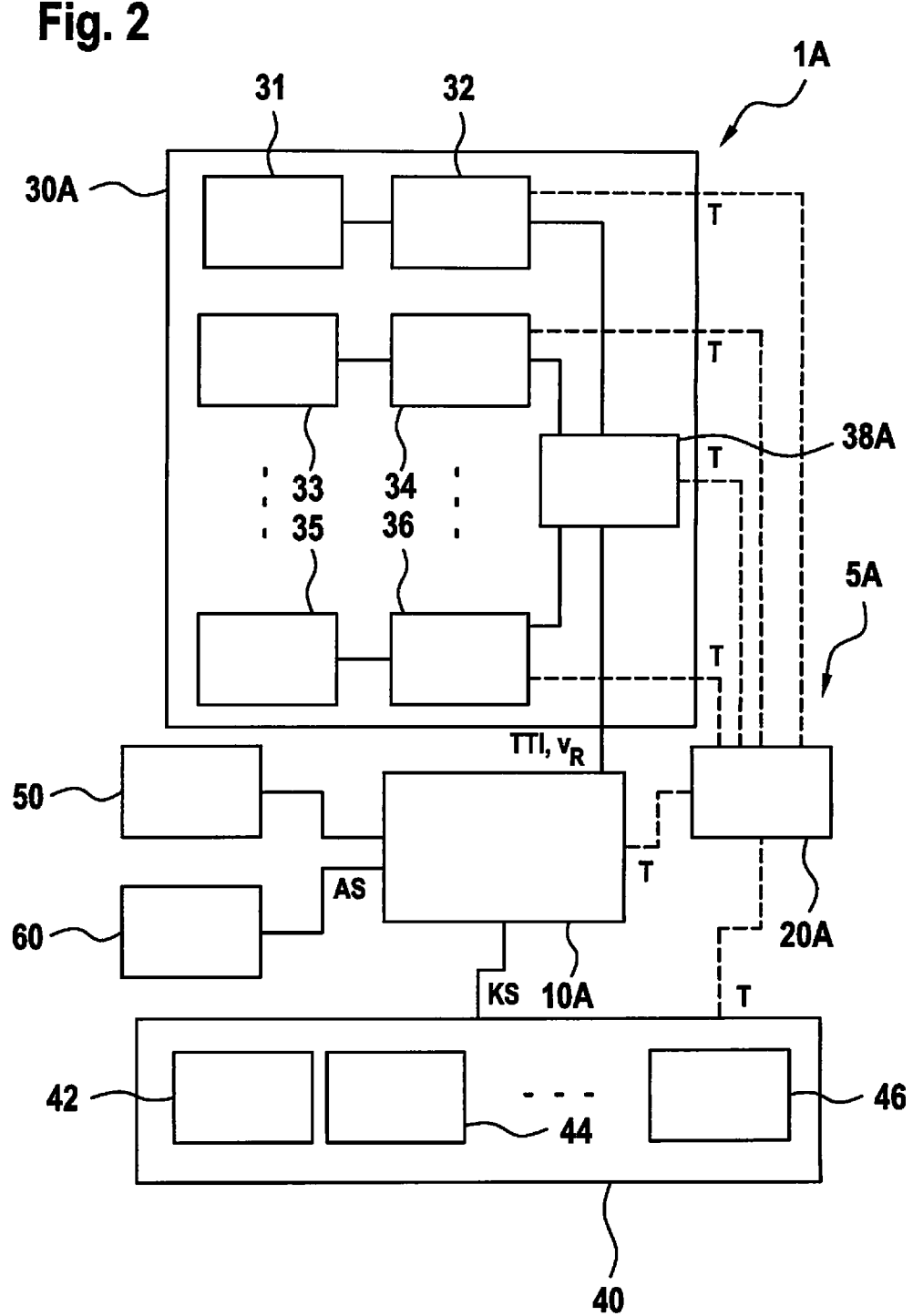
FIG. 2 shows a schematic block diagram of an integrated safety system for a vehicle, according to another example embodiment of the present invention.

As can be gathered from FIGS. 1 and 2, the illustrated exemplary embodiments of an integrated safety system 1, 1A for a vehicle include an anticipatory environment-sensor system 30, 30A, at least one precrash function 50, and a device 5, 5A, which are developed to execute a method for correcting at least one collision parameter TT1, $v_R$ determined by anticipatory environment-sensor system 30 of the vehicle. In this context, a common time basis T is established in the vehicle and the at least one collision parameter TT1, $v_R$ is output together with a time stamp to an evaluation downstream in the signal flow, which ascertains a signal age $T_A$ and/or a latency time $t_L$ of the at least one collision parameter TT1, $v_R$ on the basis of the time stamp of the at least one collision parameter TT1, $v_{VR}$ and the common time basis T, corrects the at least one collision parameter TT1, $v_R$ on the basis of the ascertained signal age $T_A$ and/or the ascertained latency time $t_L$, and outputs it to at least one precrash function 50 prior to an impact.

In the illustrated exemplary embodiment, the at least one precrash function 50 includes a prefire function, which activates a reversible restraint device and/or reversible restraint actuators prior to an impact, and a pretrigger function, which activates an irreversible restraint device and/or irreversible restraint actuators prior to an impact. Alternatively, it is also possible to provide only one of the two precrash functions 50 in integrated safety system 1, 1A of the vehicle.

As can furthermore be gathered from FIGS. 1 and 2, a time-master unit 20, 20A supplies the common time basis T, and a first evaluation and control unit 10 corrects the at least one collision parameter TTI, $v_R$, which was determined by a second evaluation and control unit 38, 38A of environment-sensor system 30, 30A, on the basis of ascertained signal age $T_A$ and/or ascertained latency time $t_L$. First evaluation and control unit 10 then outputs corrected, at least one collision parameter TTI, $v_R$. As can also be gathered from FIGS. 1 and 2, anticipatory environment-sensor system 30 has a plurality of sensor units 31, 33, 35 and signal-processing units 32, 34, 36.

Signal-processing units 32, 34, 36 convert sensor signals detected by sensor units 31, 33, 35 into sensor data that in each case include a physical quantity detected by the respective sensor unit from a physical quantity ascertained by the associated unit. The individual sensor units 31, 33, 35 can include radar sensors, ultrasonic sensors, stereo/mono video cameras, laser scanners, and PMDs (photon multiplexing devices), for example.

In the illustrated exemplary embodiments, second evaluation and control unit 38, 38A is integrated into environment-sensor system 30, 30A and determines the at least one collision parameter TT1, $v_R$ on the basis of the sensor data. In the illustrated exemplary embodiments, the at least one collision parameter includes an impact instant TTI and a relative velocity $v_R$ between the vehicle and the impact object. In addition or as an alternative, second evaluation and control unit 38, 38A can also determine a distance between the vehicle and the impact object and/or an impact location.

Moreover, as can be gathered from FIG. 1, the functionality of second evaluation and control unit 38 is integrated into one of signal-processing units 36 in the illustrated first exemplary embodiment and receives the sensor data of the other signal-processing units 32, 34.

In addition, as can be gathered from FIG. 2, in the illustrated second exemplary embodiment, second evaluation and control unit 38A is developed as a separate component assembly, which receives the sensor data from signal-processing units 32, 34, 36.

In the illustrated exemplary embodiments, first evaluation and control unit 10 fuses the corrected at least one collision parameter TT1, $v_R$ with a contact signal KS output by a contact-sensor system 40 of the vehicle and generates an activation signal AS for personal protection device 60 on the basis of the fusion after a detected impact. Moreover, as is clear from FIGS. 1 and 2, contact-sensor system 40 encompasses a plurality of contact sensors 42, 44, 46. A number of different sensor principles such as acceleration sensors, pressure sensors, structure-borne noise sensors, piezoelectric and/or optical sensors etc. can be used for the individual contact sensors 42, 44, 46.

In the illustrated exemplary embodiments, time-master unit 20, 20A is developed as a separate component assembly, which outputs common time basis T to the individual component assemblies of integrated safety system 1, 1A. Alternatively, however, time-master unit 20, 20A can also be integrated into evaluation and control unit 10, 10A or into second evaluation and control unit 38 of anticipatory environment-sensor system 30, 30A, or into one of signal-processing units 32, 34, 36, or into the contact-sensor system.

On the basis of the at least one collision parameter TTI, $v_R$, determined by the second evaluation and control unit 38, and ascertained signal age $T_A$ and/or ascertained latency time $t_L$, first evaluation and control unit 10, 10A uses an error propagation to estimate a future error of the at least one collision parameter TT1, $v_R$ in order to achieve an optimal protective function for a passenger or a pedestrian in the event of a crash. Depending on the function, 'optimal' means a very rapid reaction time of the restraint device or an adaptive protection function having a specific reaction with regard to the crash type, passenger type, passenger position, etc. The at least one collision parameter TT1, $v_R$ determined by anticipatory environment-sensor system 30, 30A, and also the at least one collision parameter TT1, $v_R$ corrected by first evaluation and control unit 10, 10A is only valid for a certain acceptance-time window $F_A$. A characteristic curve K of such an acceptance-time window $F_A$ is exemplarily illustrated in FIG. 3. If contact-sensor system 40 reacts within this acceptance-time window $F_A$, and if certain predefined threshold values TS1, TS2 are exceeded, which will be described in greater detail in the following text with reference to FIG. 4, then relative velocity $v_R$ will also be considered in the trigger decision, e.g., for separating a fire crash, in which personal protection device 50 is activated, from a no-fire crash in which no personal protection device 50 is activated. In addition, in a fire crash, it is possible to distinguish between the activation of a first stage of personal protection device 50 and the activation of the first stage as well as a second stage of personal protection device 50.

Figure 3:
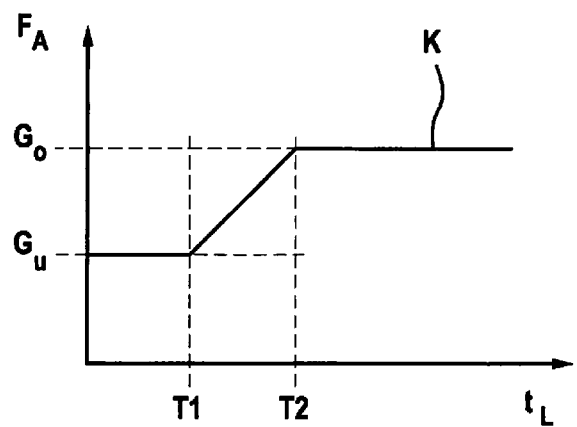
FIG. 3 shows a schematic characteristic curve diagram of a dynamic acceptance window as a function of a latency time, according to an example embodiment of the present invention.

As can additionally be gathered from FIG. 3, based on ascertained signal age $T_A$ and/or ascertained latency time $t_L$, first evaluation and control unit 10, 10A sets up a dynamic acceptance-time window $F_A$ within which the at least one collision parameter TT1, $v_R$ retains its validity for the generation of activation signal AS. As can furthermore be gathered from FIG. 3, for ascertained latency times $t_L$ that are smaller than a first value T1, dynamic acceptance-time window $F_A$ has a constant time duration, which corresponds to a lower limit value $G_u$. If the ascertained latency times $T_L$ are between first value T1 and a second value T2, then dynamic acceptance-time window $F_A$ has a variable time duration, which rises in a linear fashion between first value T1 and second value T2 of latency time $t_L$ from lower limit value $G_u$ up to an upper limit value $G_o$. If ascertained latency times $t_L$ are greater than second value T2, then dynamic acceptance-time window $F_A$ has a constant time duration that corresponds to upper limit value $G_o$.

Figure 4:
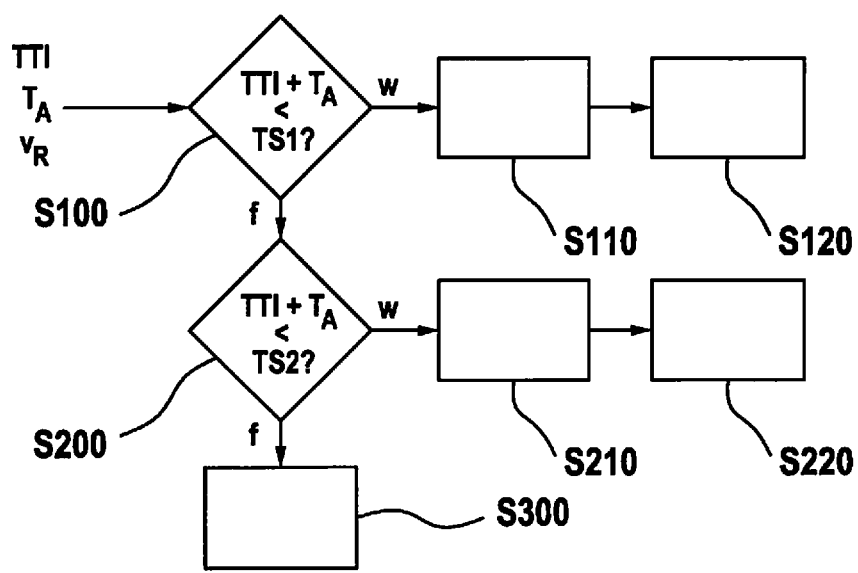
FIG. 4 is a flowchart that illustrates a dynamic selection process of velocity classes for the activation of a personal protection device according to an example embodiment of the present invention.

Moreover, as can also be gathered from FIG. 4, it is checked in a step S100 as to whether the sum of impact instant TT1, determined by second evaluation and control unit 38, and signal age $T_A$, determined by first evaluation and control unit 10, 10A, is smaller than a predefined first threshold value TS1. If this is the case, then highly resolved velocity classes are selected in step S110, which in step S120 allow for a differentiation of the crash cases based on relative velocity $v_R$, determined by second evaluation and control unit 38 and corrected by first evaluation and control unit 10, 10A on the basis of the ascertained signal age $T_A$. The differentiation is made between a no-fire crash if relative velocity $v_R$ is smaller than a first velocity value of v1=16 km/h, for example; a fire crash of the first stage if relative velocity $v_R$ is greater than first velocity value v1 and smaller than a second velocity value of v2=20 km/h, for instance; and a fire crash of the second stage if relative velocity $v_R$ is greater than second velocity value v2.

If the sum of impact instant TTI and signal age $T_A$ is not smaller than first threshold value TS1, then it will be checked in S200 whether the sum of impact instant TTI and signal age $T_A$ is smaller than a predefined second threshold value TS2, as can furthermore be gathered from FIG. 4. If this is the case, then fewer highly resolved velocity classes are selected in step S210, which, in step S220, allows for a differentiation of the crash cases on the basis of corrected relative velocity $v_R$, i.e., between the no-fire crash if relative velocity $v_R$ is smaller than a third velocity value of, for example, v3=30 km/h, and a fire crash of the second stage if relative velocity $v_R$ is greater than third velocity value v3.

If the sum of impact instant TTI and signal age $T_A$ is not smaller than second threshold value TS2, then a default value will be output in step S300, as can furthermore be gathered from FIG. 4.

Due to the at least one corrected collision parameter, example embodiments of the present invention advantageously allow for more optimal preconditioning of the trigger algorithms of the personal protection device(s) and for an improved triggering of reversible restraint device(s) and/or actuators of the prefire function, and for an improved triggering of irreversible restraint device(s) and/or actuators of the pretrigger function. The present method for correcting at least one collision parameter determined by an anticipatory environment-sensor system of a vehicle can be implemented in software or in hardware, for example, or in a mixed form of software and hardware, for instance in the first evaluation and control unit.

What is claimed is:

1. A method comprising:
  establishing a common time basis in a vehicle;
  outputting, by an anticipatory environment-sensor system of the vehicle, at least one collision parameter together with a time stamp of the at least one collision parameter, the at least one collision parameter including an estimated impact instant of an impact between the vehicle and an impact object;
  ascertaining a signal age of and/or a latency time of the at least one collision parameter based on the common time basis in the vehicle and the time stamp of the at least one collision parameter;
  correcting the at least one collision parameter based on the ascertained signal age and/or latency time;
  outputting the corrected at least one collision parameter to at least one precrash function of the vehicle prior to the impact; and
  activating, by the at least one precrash function of the vehicle, based on the output corrected at least one collision parameter, a personal protection device of the vehicle.

2. The method of claim 1, wherein the at least one collision parameter further includes at least one of a relative velocity between the vehicle and the impact object, a distance between the vehicle and the impact object, and an impact location.

3. The method of claim 2, further comprising, based on the at least one collision parameter and the ascertained signal age and/or latency time, estimating a future error of the at least one collision parameter by error propagation.

4. The method of claim 1, further comprising:
  fusing the corrected at least one collision parameter with a contact signal output by a contact-sensor system of the vehicle; and
  after detection of the impact and based on the fusion, generating an activation signal activating the personal protection device.

5. The method of claim 4, further comprising, based on the ascertained signal age and/or latency time, setting up a dynamic acceptance-time window within which the at least one collision parameter retains its validity for the generation of the activation signal.

6. The method of claim 5, wherein a length of the dynamic acceptance-time window is set based on a value of the at least one of the ascertained signal age and latency time such that the greater the ascertained signal age and/or latency time, the longer the dynamic acceptance-time window, starting from a lower limit value up to an upper limit value.

7. The method of claim 4, further comprising, based on the ascertained signal age and/or latency time, adaptively selecting velocity classes for activation of at least one of the at least one precrash function and the personal protection device.

8. The method of claim 1, wherein the personal protection device includes a reversible restraint device or an irreversible restraint device, and wherein the at least one precrash function includes:

a prefire function that activates, prior to the impact, the reversible restraint device; or a pretrigger function that activates, prior to the impact, the irreversible restraint device.

9. An integrated safety system for a vehicle, the system comprising:

an anticipatory environment-sensor system in the vehicle, the anticipatory environment-sensor system configured to output at least one collision parameter together with a time stamp of the at least one collision parameter, the at least one collision parameter including an estimated impact instant of an impact between the vehicle and an impact object;

a processor, wherein the processor is configured to:

establish a common time basis in the vehicle based on a time master;

ascertain a signal age of and/or a latency time of the at least on collision parameter based on the common time basis in the vehicle and the time stamp of at least one collision parameter, correct the at least one collision parameter based on the ascertained signal age and/or latency time;

output the corrected at least one collision parameter to at least one precrash function of the vehicle prior to the impact; and activate, by the at least one precrash function of the vehicle, based on the output corrected at least one collision parameter, a personal protection device of the vehicle.

10. The safety system of claim 9, wherein the processor is configured to:

fuse the corrected at least one collision parameter with a contact signal output by a contact-sensor system of the vehicle; and after detection of the impact and based on the fusion, generate an activation signal activating the personal protection device.

11. The safety system of claim 9, wherein the at least one collision parameter further includes at least one of a relative velocity between the vehicle and the impact object, a distance between the vehicle and the impact object, and an impact location.

12. The safety system of claim 9, wherein the personal protection device includes a reversible restraint device or an irreversible restraint device, and wherein the at least one precrash function includes:

a prefire function that activates, prior to the impact, the reversible restraint device; or a pretrigger function that activates, prior to the impact, the irreversible restraint device.

13. The method as recited in claim 1, wherein the personal protection device includes an airbag.

14. The safety system as recited in claim 9, wherein the personal protective device includes an airbag.

* * * * *